Patented Apr. 28, 1936

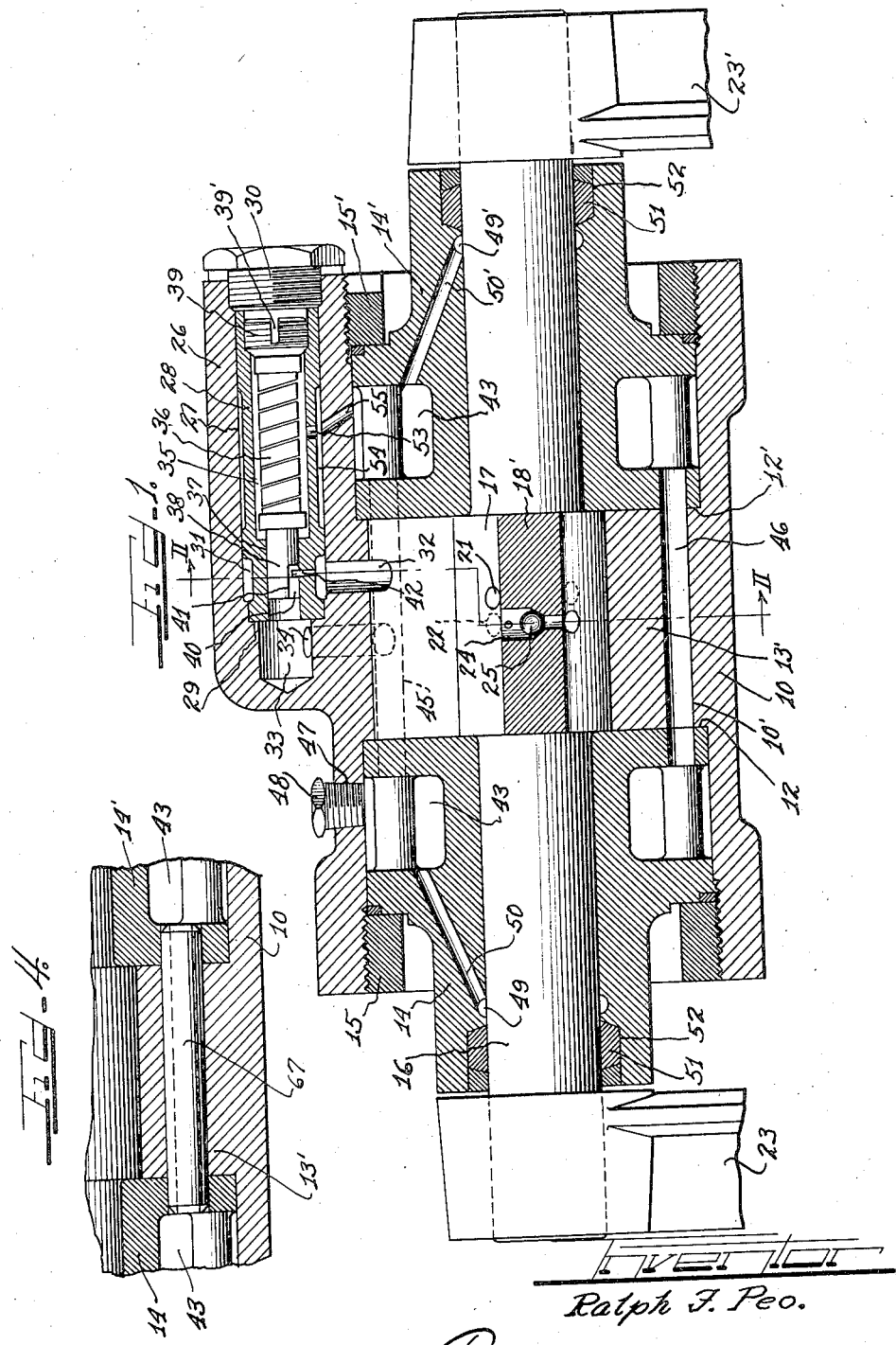

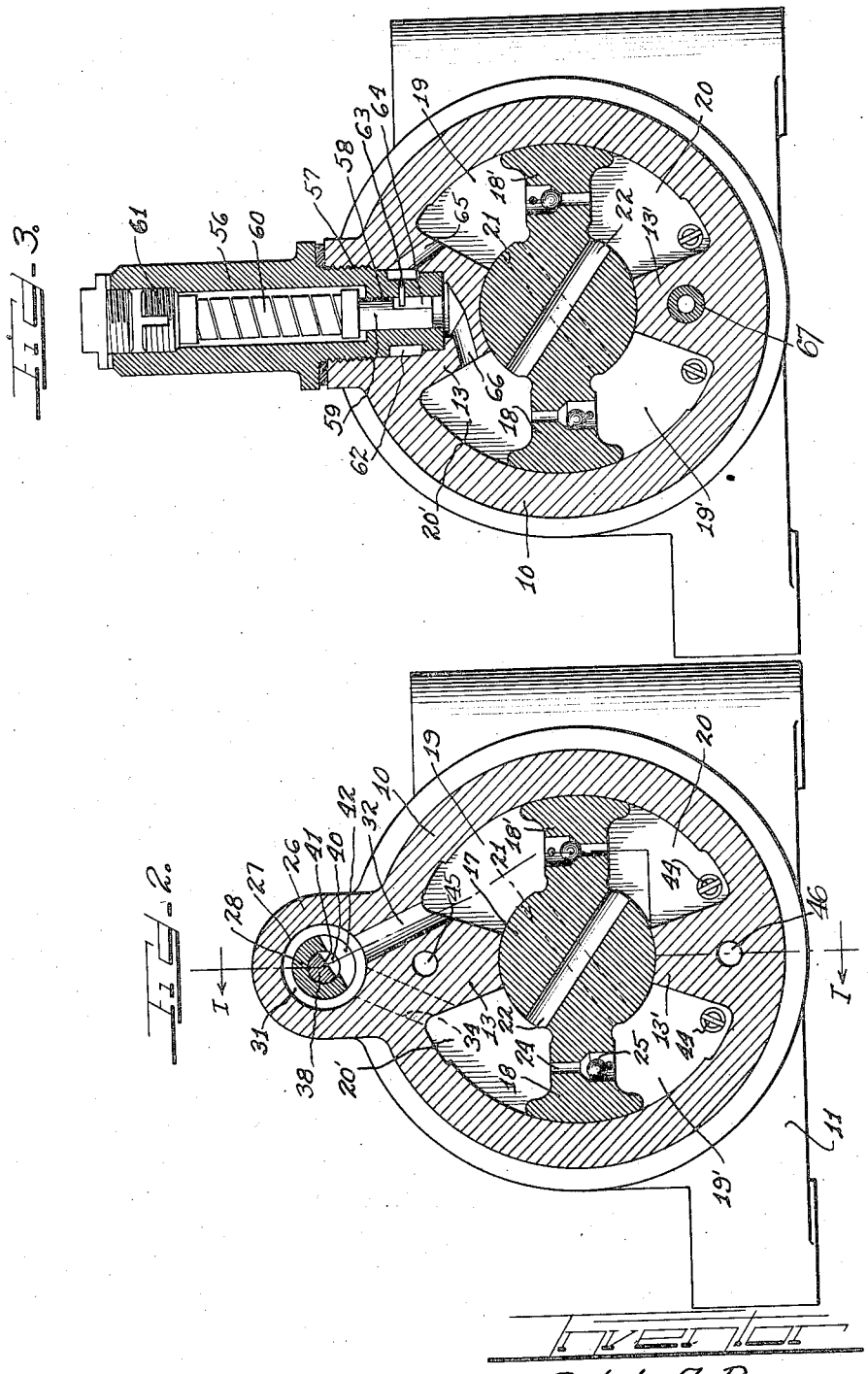

2,038,596

UNITED STATES PATENT OFFICE 2,038,596

HYDRAULIC SHOCK ABSORBER

Ralph F. Peo, Buffalo, N. Y., assignor to Houde Engineering Corporation, Buffalo, N. Y., a corporation of New York Application January 13, 1934, Serial No. 706,489

14 Claims. (Cl. 188—89)

My invention relates to hydraulic shock absorbers, particularly those of the rotary type. The object of the invention is the production of a simple compact and durable shock absorber whose construction and operation will adapt it for heavier duty and service as for example in individual suspension for automobile wheels. In such individual wheel suspension, the shaft of the shock absorber, besides oscillating the piston structure within the hydraulic working chamber, will serve as a pivot support for one of the levers in the suspension linkage quadrilateral.

The various features of my invention are incorporated in the structures disclosed on the accompanying drawings, in which drawings:

Figure 1 is a diametral section of the shock absorber on plane I—I of Figure 2;

Figure 2 is a section on plane II—II of Figure 1;

Figure 3 is a section similar to Figure 2 but showing a modified arrangement; and Figure 4 is a fragmentary section showing a modified arrangement for connecting the fluid reservoirs.

The structure shown comprises a cylindrical annular housing 10 having a supporting base structure 11 by which it may be mounted on a suitable support as for example the chassis or frame of an automotive vehicle. At its middle part the housing is of reduced interior diameter to provide a cylindrical inner surface 10' and abutment shoulders 12 and 12'. Extending radially from the part 10 and preferably formed integral with the housing 10 are upper and lower partition lugs 13 and 13' which extend radially. Fitting in one end of the housing 10 to abut the shoulder 12 and the adjacent ends of the partition lugs is an end wall structure 14 secured in place by an annular nut 15 threading into the end of the housing. Fitting in the opposite end of the housing 10 is a similar wall structure 14' abutting the shoulder 12' and the adjacent ends of the partition lugs and this wall structure is held in place by an annular nut 15'. The housing part 10' and these end walls define a cylindrical space for containing hydraulic fluid, into which space the partition lugs 13 and 13' extend.

Journalled in the wall structures 14 and 14' are the ends of the shock absorber shaft 16 which between the wall structures has the hub 17 from which extend vanes 18 and 18' in opposite radial direction and engage at their outer faces against the cylindrical surface 10' while the cylindrical hub engages with the inner surfaces of the partition lugs, the piston structure and the partitions dividing the cylindrical space into high pressure chambers 19 and 19' and low pressure chambers 20 and 20'. The high pressure chambers are always in communication with each other through a duct or passage 21 extending diametrally through the piston hub and the low pressure chambers are always in communication with each other through a duct or passage 22 through the piston hub. Secured to the ends of the shaft 16 are lever arms 23 and 23' which may be part of a unitary lever structure connected at its other end as for example to the vehicle axle, or to the wheel bearing supporting frame in an individual wheel suspension system.

As the shock absorber shaft is rotated the vanes 18 and 18' oscillate and tend to displace the hydraulic fluid within the working chambers. Provision is made for controlling the resistance to the displacement of the fluid, the resistance being usually less during the bump strokes of the piston structure when the vehicle chassis and the axle or wheel approach each other, and greater for the rebound strokes, when the vehicle chassis and the axle or wheel separate. To reduce the resistance during the bump strokes of the piston each vane may be provided with a passageway 24 therethrough controlled by a check valve such as a ball 25 which opens the passageway during the bump stroke but closes them against fluid flow during the rebound stroke. To meter the fluid flow and resistance during the rebound stroke a valve controlled connection is provided between the high pressure chambers and the low pressure chambers. In the arrangement shown in Figures 1 and 2 the valving structure is within a longitudinal extension 26 on top of the housing 10. This extension has the bore 27 for receiving a valve supporting housing 28 which abuts against the shoulder 29 at the inner end of the bore and is secured in position by a plug 30 threading into the outer end of the bore. At its inner end the housing 28 has the circumferential external channel 31 which registers with the port or passageway 32 extending through the wall 10 and the upper partition lug 13 and which connects this circumferential channel with the upper, high pressure chamber 19. The reduced end 33 of the bore 27 beyond the shoulder 29 is connected by a port or passage 34 with the upper low pressure chamber 20', the passage extending through the wall 10 and the upper partition lug 13.

At its outer end the frame 28 has the bore or chamber 35 for receiving the helical thermostat element 36 and through the inner end of the frame 28 extends the cylindrical bore 37 of reduced diameter for receiving the cylindrical valve plug 38. The thermostat element is secured at its inner end to the valve plug and at its outer end to a head 39 having threaded engagement in the bore 35.

The valve 38 may be of the rotary type such as is disclosed in Ralph F. Peo application Serial No. 645,725 filed December 5, 1932. The valve plug is milled to provide a longitudinally extending port 40 and a vane or impact surface 41. The seat end of the frame 28 has a transverse slot or slit 42 therein extending a distance circumferentially in register with the channel 31 and the valve port 40. During rebound stroke of the shock absorber piston structure the hydraulic fluid will be forced from the high pressure chamber through the passage 32 into the annular channel 31 and through the restricted slot or orifice 42 and through the valve port 40 to the space 33 and from there through the passage 34 to the low pressure chamber. The arrangement is such that the impact of the fluid against the vane 41 will tend to rotate the valve plug towards closing position to decrease the exposed length of the orifice 42 in accordance with the impact pressure of the fluid, the operation being the same as that disclosed in the Peo copending application referred to. This restricted orifice passageway forms the sole pass for escapement of the fluid from the high pressure to the low pressure chambers. During the bump strokes of the piston structure most of the fluid will flow through the passageways 24 and the remainder will flow through the restricted orifice controlled path.

The threaded head 39 may be provided with a screw driver slot 39' so that it may be readily turned for initial manual setting of the valve plug relative to the orifice 42. Thereafter the thermostat element will automatically adjust the valve relative to the orifice in accordance with changes in temperature of the fluid and resulting change in viscosity, and the thermostat helical coil serves also as a spring for resisting rotational movement of the valve plug by the pressure impact and to return the plug after the pressure abates.

The end wall structures 14 and 14' are of similar construction and each has the annular space 43 surrounded by the housing wall 10 and providing a fluid reservoir for replenishing the working chambers with fluid. The inner wall of one or both of the end wall structures 14 and 14' may have passageways 44 therethrough for connecting the respective reservoirs with the lower working chambers 19' and 20 as indicated in Figure 2, these passageways being controlled by suitable check valves so that fluid may flow from the reservoirs into the working chambers but not in reverse direction. The replenishing chambers or reservoirs are connected at the top and the bottom by passageways 45 and 46 extending respectively through the upper and lower partition lugs 13 and 13'. When the reservoirs are thus interconnected only one filler opening is necessary and I have shown a filler opening 47 provided for the reservoir in the wall structure 14, this filler opening being normally closed by a plug 48.

Any fluid which may be forced out of the working chambers between the shaft and the end wall structure 14 is intercepted by the circumferential groove 49 in the wall structure and surrounding the shaft, and the intercepted fluid is returned through a passage 50 in the wall structure 14 to the reservoir in the wall structure. Similarly a duct 50' returns to the reservoir in the wall structure 14' any fluid intercepted by the groove 49' after being forced out between the shaft and the wall structure 14'. Beyond these intercepting grooves the shaft ends are surrounded by suitable packing material 51 pressed into the recesses 52 at the shaft ends so that fluid cannot reach the exterior of the shock absorber.

Owing to the pressure of the fluid, particularly during the rebound strokes of the piston structure, there will be considerable leakage of fluid past the valve plug and into the chamber 35 in which the thermostat coil is located. Provision is made to return this fluid to one of the reservoirs so that there will be a constant circulation of warm fluid from the working chambers around the thermostat coil so that the thermostat coil will be subjected to the same temperature as that of the fluid within the working chambers and will thereby more accurately automatically adjust the valve in accordance with the temperature in the working chamber. As shown an outlet port 53 through the wall 28 connects the thermostat chamber 35 with the circumferential trough 54 in the frame 28 from which trough the fluid flows through the passage 55 in the wall 10 and to the reservoir 43 in the end wall structure 14'.

In the modified arrangement disclosed in Figure 3, the hydraulic fluid flow controlling valve mechanism is contained within the plug 56 adapted for detachable application in the pocket 57 extending radially in the wall 10 and upper partition lug 13, the plug preferably having threaded engagement in said pocket. At its lower end the plug has the cylindrical passage or bore part 58 forming a seat for the rotary valve 59, the valve being secured to the lower end of the thermostat coil 60 which at its upper end is secured to the threaded adjusting head 61. The plug has the annular channel 62 surrounding the valve seat bore and the circumferentially extending orifice slot 63 connecting this channel with the valve port 64. The annular channel is connected by a passage 65 with the upper part of the high pressure chamber 19 and the pocket 57 below the plug is connected by a duct 66 with the upper low pressure chamber 20' so that the flow between the chambers includes the orifice slot 63 whereby the resistance to the flow is metered and controlled.

The arrangement in Figure 3, like that of Figures 1 and 2 has end wall structures 14 and 14' forming the sides of the pressure chambers, and for the arrangement of Figure 3 I have shown a bored dowel pin 67 extending through the lower partition lug 13' and through the inner sides of the end wall structures for communication with the reservoirs in the wall structures so that the reservoirs are in communication (Figure 4). This dowel pin will then also serve as a means for guiding the end wall structures 14 and 14' to their proper positions when the shock absorber is assembled.

I have shown practical and efficient embodiments of the features of my invention but I do not desire to be limited to the exact structure arrangement and operation shown and described as changes and modifications may be made which will still come within the scope of the invention.

I claim as follows:

1. In a hydraulic shock absorber the combination of a housing structure comprising an annular cylindrical wall and end wall structures secured in the ends of said annular wall and defining therewith a working chamber for containing hydraulic fluid, a shaft concentric with said walls and journalled at its outer ends in said end walls, said shaft having a piston vane structure extending therefrom into said working chamber for displacement of the fluid therein when the shaft is oscillated, adjustable means controlling the resistance to the displacement of the fluid by the piston vane structure, a fluid reservoir chamber in each of said end walls, means connecting said reservoir chambers for the interflow of fluid, and connections for the flow of replenishing fluid from said reservoir chambers to said working chamber.

2. In a hydraulic shock absorber, the combination of a housing structure comprising a cylindrical annular wall and end wall structures fitting into the ends of said annular wall and secured therein to define with said annular wall a cylindrical space for containing hydraulic fluid, a shaft concentric with said space and journalled at its ends in said end walls, partitions extending into said space from said annular wall, a piston hub in said space between said partitions and having piston vanes extending therefrom into said space and with said partitions dividing said space into high pressure and low pressure working chambers, an extension on the outside of said housing structure bored to provide a valve chamber, passageways connecting said valve chamber with said high and low pressure working chambers respectively, a valve operable in said valve chamber for metering the flow of fluid between said pressure chambers and through said passageways, a fluid reservoir in each of said end wall structures, and connections between said reservoirs and said working chambers for the flow of replenishing fluid.

3. In a hydraulic shock absorber, the combination of a housing structure providing a working chamber intermediate its ends and a hydraulic fluid reservoir in each end, a shaft journalled in said housing structure and having a piston structure operable in said working chamber to displace hydraulic fluid therein, an extension on the outside of said housing structure bored to provide a valve chamber, valving means in said valve chamber for controlling the resistance to the displacement flow of the fluid, and connections between said fluid reservoirs and said working chamber for the flow of replenishing fluid to said chamber.

4. In a hydraulic shock absorber, the combination of a housing structure providing space for hydraulic fluid, a piston structure operable in said space to displace the fluid therein and dividing said space into working chambers at opposite sides of said piston structure, an extension on the outside of said housing structure bored to provide a valve chamber, passages connecting said valve chamber with said working chambers for the flow of fluid between said working chambers, a valve in said valve chamber for metering the flow between said working chambers to thereby determine the hydraulic resistance to the piston operation, a fluid reservoir within said housing structure and means connecting said reservoir with the working chambers to replenish said chambers with fluid, a thermostat element in said valve chamber connected with said valve to automatically adjust said valve for control of the fluid flow in accordance with temperature changes, said thermostat element being in the path of fluid leaking past said valve into said valve chamber, and a connection from said valve chamber to the fluid reservoir for returning the leakage fluid thereto.

5. In a hydraulic shock absorber, the combination of a cylindrical annular housing structure, end wall structures fitting into the ends of said housing structure and defining therewith a cylindrical space for hydraulic fluid, upper and lower partition lugs extending from said annular wall into said space between said end wall structures, a piston structure in said space having piston vanes extending between said lugs and dividing said space into high pressure and low pressure chambers, a supporting shaft for said piston structure having its ends extending through and journalled in said end wall structures, passageways through said piston structure for connecting said pressure chambers for interflow of fluid and a valve structure for metering such flow, a replenishing reservoir formed in each of said end wall structures, passageways affording a connection for flow of replenishing fluid from said reservoirs to said working chambers, and a duct through the lower partition lug communicating with said reservoirs for the flow of fluid between said reservoirs.

6. In a hydraulic shock absorber the combination of a housing structure comprising an annular cylindrical wall, end wall structures fitting into and secured in the opposite ends of said annular wall and defining therewith a cylindrical space for hydraulic fluid, upper and lower partition lugs extending from said annular wall and into said space between said end wall structures, a piston structure operable in said space between said lugs and dividing said space into working chambers at opposite sides of the piston structure, valve means for metering the displacement flow to thereby determine the resistance to such flow, a fluid reservoir space in each of said end wall structures and means connecting said spaces with the working chambers for the flow of replenishing fluid thereto, and a dowel pin extending through one of said partition lugs and into the reservoir spaces in said end wall structures, said pin serving to align said end wall structures and having a bore therethrough for the flow of fluid between said reservoir spaces.

7. In a hydraulic shock absorber, the combination of a housing structure providing a hydraulic working chamber intermediate its ends and a hydraulic fluid reservoir in each end, a shaft journalled in said housing structure and having a piston structure operable in said working chamber to displace hydraulic fluid therein, an extension on the outside of said housing structure bored to provide a valve chamber, valving means in said valve chamber for controlling the resistance to the displacement flow of the fluid, connections between said reservoir and said working chamber for the flow of replenishing fluid to said chamber, means affording fluid flow connection between said reservoirs at the bottom thereof and means affording fluid flow connection between said reservoirs at the top thereof, and a filler opening for one of said reservoirs.

8. In a hydraulic shock absorber, the combination of an annular wall, end wall structures fitting into the ends of said annular wall and defining therewith a cylindrical space for hydraulic fluid, upper and lower partition lugs extending from said annular wall into said space between said end wall structures, a piston structure in said space having piston vanes extending between said lugs and dividing said space into high pressure and low pressure chambers, a supporting shaft for said piston structure having its ends extending through and journaled in said end wall structures, passageways through said piston structure for connecting said pressure chambers for interflow of fluid, a valve structure for metering such interflow, a replenishing reservoir formed in each of said end wall structures, each of said end wall structures having an intercepting channel for fluid escaping from the working chambers along the respective shaft ends and a duct connecting the intercepting channel with the reservoir formed in the respective end wall structure, and a duct through the lower partition lug communicating with said reservoirs for the interflow of fluid.

9. In a hydraulic shock absorber, the combination of a cylindrical annular wall, detachable end walls secured in the opposite ends of said annular wall to form therewith a hydraulic working chamber, a piston structure operable in said chamber, a fluid reservoir in each of said end walls, means for conducting replenishing fluid from said reservoirs to said working chamber, and an interconnection between said reservoirs.

10. In a hydraulic shock absorber, the combination of an annular wall and end walls forming a hydraulic working chamber, a piston operable in said chamber, a fluid reservoir in one of said end walls for supplying replenishing fluid to said working chamber, an enlargement on the outside of said annular wall providing a valve chamber, a valve in said valve chamber for controlling the flow of the fluid displaced by said piston, and a connection between said valve chamber and said reservoir for returning to said reservoir any fluid leaking past said valve.

11. In a hydraulic shock absorber, the combination of a cylindrical annular wall and end walls defining a hydraulic working chamber, a piston operable in said chamber, an enlargement on the outside of said annular wall having a bore, a valve seated in said bore and operable to control the flow of the fluid displaced by said piston, a thermostat element in said bore for adjusting said valve in accordance with change of temperature of the fluid, one of said end walls forming a fluid reservoir for replenishing fluid leaking from said working chamber, and a connection between said bore and said reservoir for returning to said reservoir any fluid escaping past said valve.

12. In a hydraulic shock absorber, the combination of an annular wall and end walls defining a hydraulic working chamber, a piston operable in said working chamber to displace the fluid therein, an enlargement on the outside of said annular wall having a bore, a bushing in said bore defining a valve chamber and a thermostat chamber, ports connecting said valve chamber with said working chamber, a valve operable in said valve chamber for controlling said ports and thereby the flow of the fluid displaced by said piston, a thermostat in said thermostat chamber for adjusting said valve in accordance with change in temperature, one of said end walls being hollow to provide a fluid reservoir, and a connection between said reservoir and the theromstat chamber for returning to said reservoir any fluid leaking past said valve.

13. In a hydraulic shock absorber, the combination of an annular wall, detachable end walls secured in the opposite ends of said annular wall to form therewith a hydraulic working chamber, a shaft extending through and journalled in said end walls, a piston vane on said shaft operable in said working chamber to displace the fluid therein when the shaft is oscillated, valve means for controlling the flow of the displaced fluid, a fluid reservoir in each of said end walls, an interconnection between said reservoirs, and means for conducting replenishing fluid from said reservoir to said working chamber.

14. In a hydraulic shock absorber, the combination of an annular wall, a partition extending radially from said annular wall, end walls within the opposite ends of said annular wall and engaging said partition to form the sides of a hydraulic working chamber surrounded by said annular wall, a piston structure operable in said working chamber to displace hydraulic fluid therein, valve means controlling the flow of the displaced fluid, a fluid reservoir in each of said end walls, a pin extending through said partition and into said end walls to secure said end walls against rotational displacement, said pin being hollow for the interflow of fluid between said reservoirs, and means for conducting replenishing fluid from said reservoirs to said working chamber.

RALPH F. PEO.